UNITED STATES PATENT OFFICE.

RICHARD KOTHE, OF VOHWINKEL, AND ANTON OSSENBECK, OF ELBERFELD, GERMANY, ASSIGNORS TO FARBENFABRIKEN VORM. FRIEDR. BAYER & CO., OF ELBERFELD, GERMANY, A CORPORATION OF GERMANY.

AZO COLORING-MATTER.

No. 843,756.  Specification of Letters Patent.  Patented Feb. 12, 1907.

Application filed November 6, 1906. Serial No. 342,288.

*To all whom it may concern:*

Be it known that we, RICHARD KOTHE and ANTON OSSENBECK, citizens of the German Empire, residing at, respectively, Vohwinkel, near Elberfeld, and Elberfeld, in the Kingdom of Prussia, Germany, have invented new and useful Improvements in new Azo Coloring-Matters, of which the following is a specification.

We have found that new and valuable azo dyestuffs are obtained by combining the diazo compounds of non-sulfonated chloro-ortho-aminophenolic compounds with 2-arylamino-5-naphthol-7-sulfonic acids.

The new dyestuffs are in the shape of their alkaline salts dark powders soluble in water and dyeing wool from acid-baths generally from red to violet shades, which on chroming change to from violet to blue to black fast shades. By reduction of the new dyestuffs with stannous chlorid and hydrochloric acid non-sulfonated chloro-ortho-aminophenolic compounds and 2-arylamino-5-naphthol-6-amino-7-sulfonic acids are obtained.

In carrying out the new process practically we can proceed as follows, the parts being by weight: 14.4 parts of 4-chloro-2-aminophenol are diazotized in the usual way, and the diazo compound is then introduced into a strongly alkaline solution of thirty-two parts of 2-phenylamino-5-naphthol-7-sulfonic acid.

The dyestuff separates after a short time. It is filtered off and dried. It is after being dried and pulverized in the shape of its sodium salt a dark powder soluble in water with a violet color and in concentrated sulfuric acid with a violet color. By reduction with stannous chlorid and hydrochloric acid 4-chloro-2-aminophenol and 2-phenylamino-5-naphthol-6-amino-7-sulfonic acid is obtained.

The new dyestuff dyes wool from acid-baths red shades, which are changed to blue-black when chromed after dyeing.

The process is carried out in an analogous manner on using other diazo compounds of non-sulfonated chloro-ortho-aminophenolic compounds or other 2-arylamino-5-naphthol-7-sulfonic acids, such as 2-paratolylamino-5-naphthol-7-sulfonic acid, 2-ortho-anisylamino-5-naphthol-7-sulfonic acid, or the like.

The dyestuff obtained—*e. g.*, from the diazo compound of 4-chloro-2-aminophenol and 2-paratolylamino-5-naphthol-7-sulfonic acid—dyes wool from acid-baths red, which is changed to violet when chromed after dyeing.

The dyestuff obtained from the diazo compound of 4-6-dichloro-2-aminophenol and 2-phenylamino-5-naphthol-7-sulfonic acid dyes wool bordeaux, turning to a reddish blue by treatment with chromium compounds, and the dyestuff obtained from the diazo compound of 6-chloro-2-amino-4-cresol and 2-phenylamino-5-naphthol-7-sulfonic acid dyes wool from acid-baths bordeaux, turning to a navy blue when chromed after dyeing.

Having now described our invention and in what manner the same is to be performed, what we claim as new, and desire to secure by Letters Patent, is—

1. The herein-described new azo dyestuffs obtainable by combining diazo compounds of non-sulfonated chloro-ortho-aminophenolic compounds with 2-arylamino-5-naphthol-7-sulfonic acids, which dyestuffs are, after being dried and pulverized, in the shape of their alkaline salts dark powders soluble in water; yielding upon reduction with stannous chlorid and hydrochloric acid, chloro-ortho-aminophenolic compounds and 2-aryl-ortho-aminophenolic compounds and 2-arylamino-5-naphthol-6-amino-7-sulfonic acids and dyeing wool from acid-baths generally from red to violet shades, which on chroming change to from violet to blue to black shades, substantially as hereinbefore described.

2. The herein-described new azo dyestuff, which can be obtained by combining diazotized 4-chloro-2-aminophenol with 2-phenylamino-5-naphthol-7-sulfonic acid, which dyestuff is, after being dried and pulverized, in the shape of its sodium salt a dark powder soluble in water with a violet color and in concentrated sulfuric acid with a violet color;

yielding upon reduction with stannous chlorid and hydrochloric acid 4-chloro-2-aminophenol and 2-phenylamino-5-naphthol-6-amino-7-sulfonic acid; and dyeing wool from acid-baths red shades, which are changed to blue-black when chromed after dyeing, substantially as hereinbefore described.

In testimony whereof we have hereunto set our hands in the presence of two subscribing witnesses.

RICHARD KOTHE.
ANTON OSSENBECK.

Witnesses:
 OTTO KÖNIG,
 J. A. RITTERSHAUS.